United States Patent [19]

Vesel

[11] 4,095,186

[45] June 13, 1978

[54] VARIABLE PHASE SHIFTER

[75] Inventor: Andrew M. Vesel, Mount Arlington, N.J.

[73] Assignee: The Cessna Aircraft Company, Wichita, Kans.

[21] Appl. No.: 748,340

[22] Filed: Dec. 7, 1976

Related U.S. Application Data

[62] Division of Ser. No. 561,466, Mar. 24, 1975, Pat. No. 4,014,025.

[51] Int. Cl.² .................................................. H03K 5/13
[52] U.S. Cl. ........................................ 328/133; 328/55; 328/155; 324/83 D
[58] Field of Search ................... 328/133, 134, 55, 155; 324/83 D

[56] References Cited

U.S. PATENT DOCUMENTS

| | | | |
|---|---|---|---|
| 3,271,688 | 9/1966 | Gschwind et al. | 328/55 |
| 3,312,903 | 4/1967 | Webb | 328/133 X |
| 3,328,688 | 6/1967 | Brooks | 328/133 X |
| 3,500,214 | 3/1970 | Broadhead et al. | 328/55 X |
| 3,588,710 | 6/1971 | Masters | 328/133 |
| 3,600,690 | 8/1971 | White | 328/133 |
| 3,663,956 | 5/1972 | Purdy et al. | 328/133 X |
| 3,728,635 | 4/1973 | Eisenberg | 328/55 |
| 3,833,854 | 9/1974 | Schonover | 328/55 X |
| 3,889,186 | 6/1975 | Larson | 324/83 D |

Primary Examiner—John S. Heyman
Attorney, Agent, or Firm—Beveridge, De Grandi, Kline & Lunsford

[57] ABSTRACT

A variable phase shifter and comparator useable, for example, in a scalloping suppression system within a V.H.F. Omni Range (VOR) aircraft bearing determining system. The digital phase shifter-comparator network is employed to cause a phase of the reference signal to follow a phase of the variable phase signal. The phase shifter is comprised of two counters and the phase comparator is comprised of a bistable multivibrator. The delayed reference signal is the output of the system, and an analog rate controller is employed to limit the rate at which the reference signal can follow the variable phase signal.

13 Claims, 10 Drawing Figures

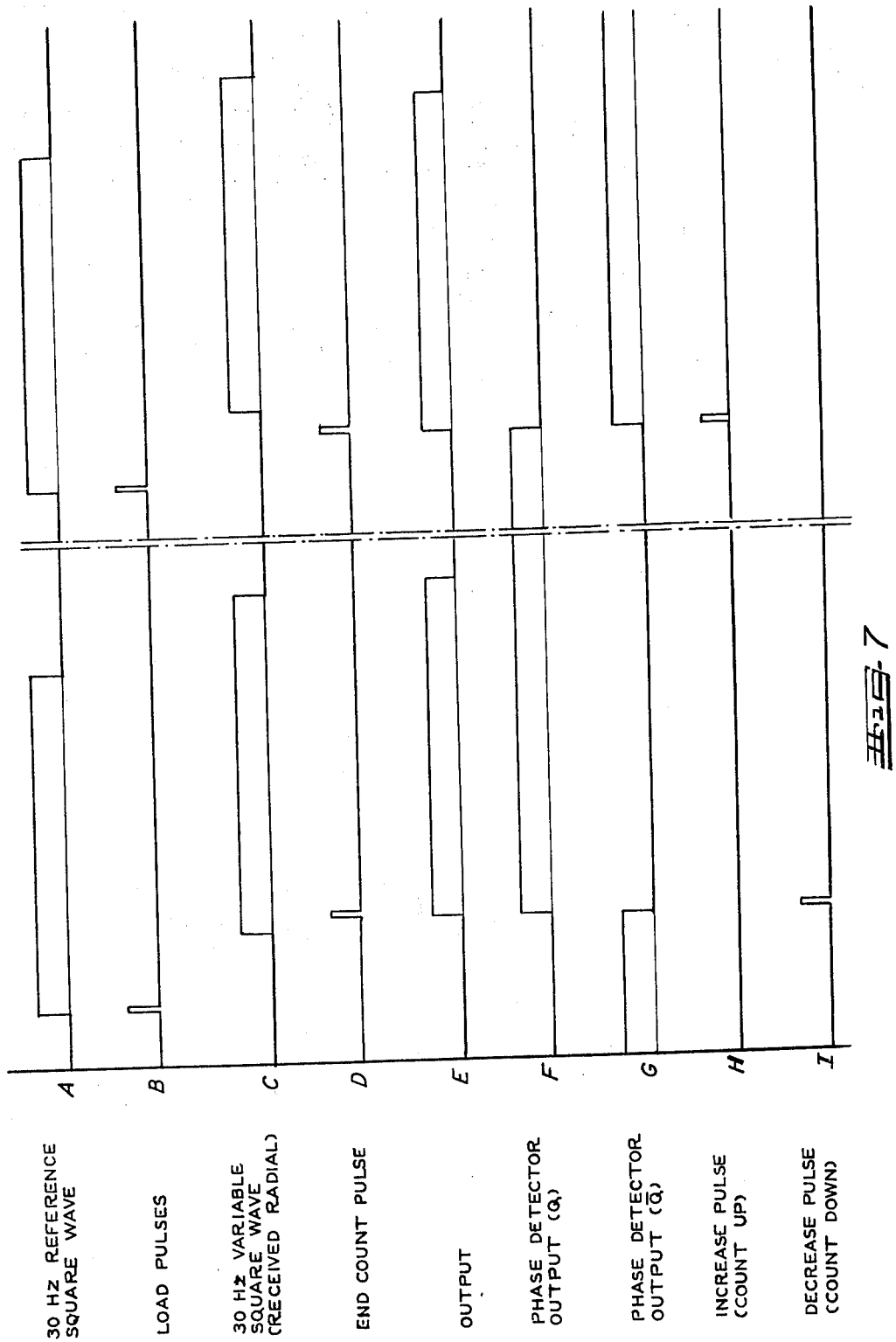

VARIABLE PHASE SHIFTER

This is a division of application Ser. No. 561,466 filed Mar. 25, 1975, now U.S. Pat. No. 4,014,025.

The present invention relates to a variable phase digital phase shifter and comparator useable, for example in a scalloping suppression system within a V.H.F. Omni Range (VOR) aircraft angular position determining system.

A VOR aircraft navigation system is used to determine the angular position of an aircraft with respect to a ground station of known location. VOR ground stations transmit bearing information on separate assigned carrier frequencies so that an aircraft having a VOR receiver may tune in to a selected station or stations. Each ground station emits two 30 Hz sinusoidal information signals which are displaced in phase. One 30 Hz signal is a reference signal and is radiated with the same phase in all directions from the ground station. The other 30 Hz signal is a variable phase signal the phase of which varies with the angle of the radial on which the signal is transmitted. This signal has the same phase as the reference signal only at the 0° radial indicative of the direction north but is 90° out of phase with the reference signal at the 90° radial, is 180° out of phase at the 180° radial, and so on. At the aircraft a VOR receiver demodulates the carrier signal to detect the information signal comprised of the two 30 Hz sinusoidal waves and determines the phase difference between the two signals and thus the bearing of the aircraft with respect to the ground station.

It is an object of the invention to provide an improved digital phase shifter having an adjustable phase shift and useable, for example, within a VOR aircraft navigation system.

It is still a further object of the invention to provide an improved digital phase comparator.

The variable phase shift digital phase shifter of the present invention is comprised of a pair of up-down counters. A number stored in the first counter is indicative of the desired phase shift or delay and, upon the occurrence of the leading edge of the reference signal to be delayed, this number is parallel loaded into the second counter which is then down counted, the end count signal being indicative of the delayed leading edge. The number is retained in the first counter and the delay can be increased or decreased by increasing or decreasing the stored number.

The digital phase comparator is comprised of a clocked bistable multivibrator having a variable phase square wave applied thereto and being clocked at the time of occurrence of the delayed leading edge of the reference signal. The multivibrator determines whether the variable phase signal is low or high at the time of occurrence of the delayed reference signal and thus determines whether the delayed reference signal leads or lags the variable phase signal, and means are provided to pulse the first up-down counter to increase or decrease the number stored therein dependent on whether a lead or lag is indicated.

The invention will be better understood by referring to the accompanying drawings in which:

FIG. 7 is a waveform diagram useful in explaining the operation of the system of FIG. 6.

A scalloping suppression system of the type in which the digital phase shifter of the present invention might be utilized is essentially a closed loop feedback system. The system accepts at its input a square wave which is of the same phase as the received variable 30 Hz sine wave. At steady state, the output of the system is a square wave which is of the same phase as the input, but the rate at which the phase of the output can change is limited to some maximum value, and therefore there is a maximum rate at which the output can track the input. This is illustrated graphically in FIGS. 1 to 3.

Figure 1:
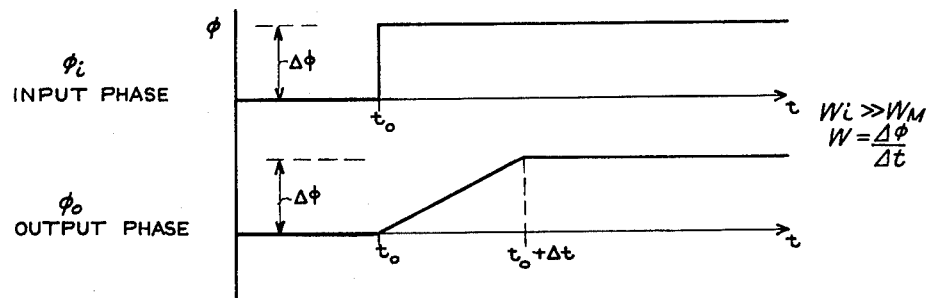
FIGS. 1, 2 and 3 are graphical illustrations of the phase change limiting properties of the system of the invention.

In FIG. 1 the phase of the input wave $\phi_i$ is a step function which instantaneously changes its value at time $t_0$. Since the input rate of change is much greater than the maximum permissible rate of change the phase of the output wave changes more slowly as shown in FIG. 1 and does not reach the upper value of the step input until time $t_0 + \Delta_t$.

Figure 2:
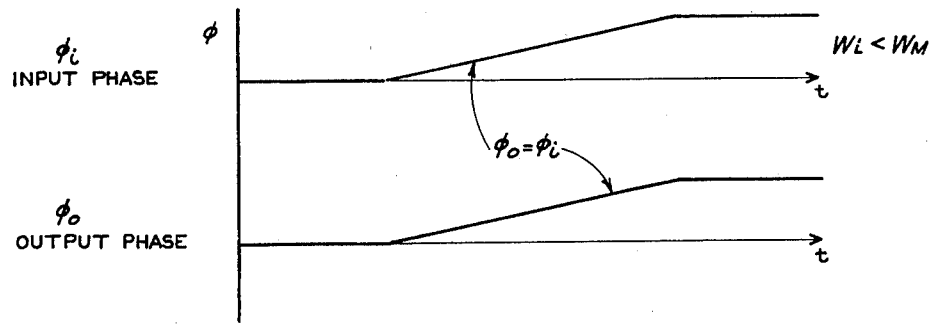

FIG. 2 illustrates the situation where the phase of the input wave changes as a ramp function and where the rate of change of input phase $\omega_i$ is less than the maximum permissible rate of change of phase $\omega_m$. In this case the output phase changes in exactly the same way as the input phase at all times. FIGS. 1 and 2 thus illustrate that the system of the invention can follow slow changes in phase of the input wave but not fast changes in phase.

Figure 3:
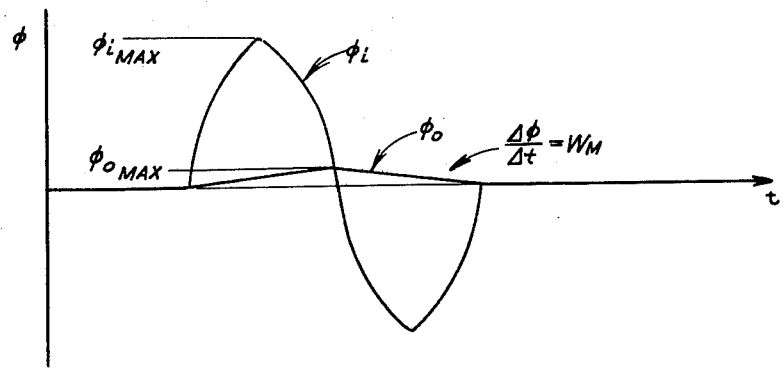

FIG. 3 illustrates how the scalloping suppression system minimizes the effects of scalloping. In this Figure the scalloping phenomenon is modeled to be a zero mean sinusoidal fluctuation in the received radial and the rate of change of phase of this sinusoidal fluctuation is much greater than $\omega_m$. These assumptions are both intuitively and empirically correct. As shown in FIG. 3, the peak deviation at the output of the system is much less than the peak deviation at the input to the system and we can therefore choose $\omega_m$ to be the maximum rate of change of phase due to actual position change of the aircraft and still suppress the fast fluctuations which are presented by scalloping.

Figure 4:
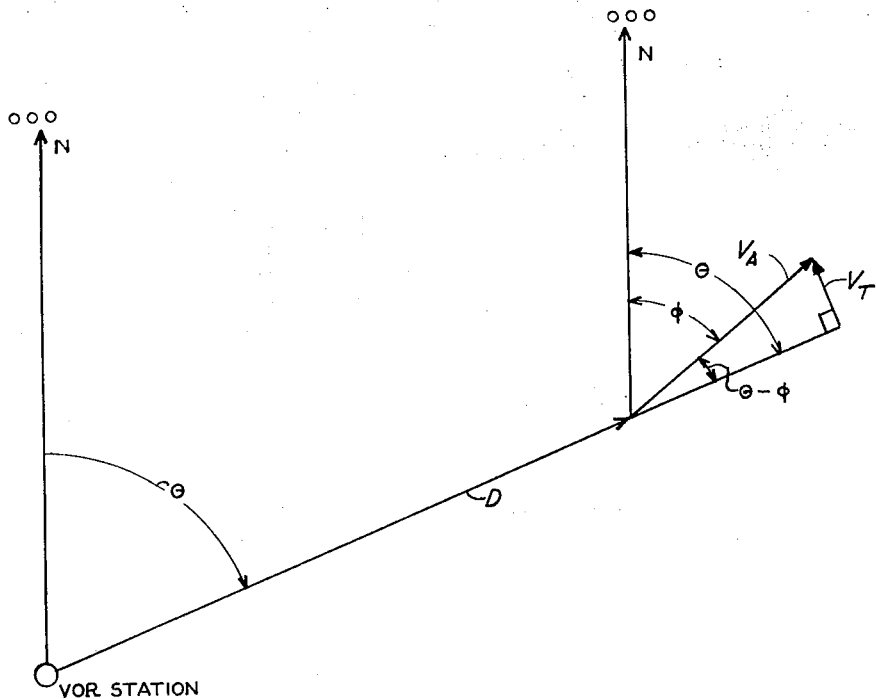
FIG. 4 is a diagram useful in deriving the expression for the maximum rate of change of phase which is due to changes in position of the aircraft itself.

The maximum rate of change of received phase which is due to an actual position change of the aircraft can be calculated from the dynamics of the situation and this is illustrated in FIG. 4. In the diagram of that Figure D, $\angle\theta$ is the aircraft position vector, $V_A$ is the aircraft velocity, $V_T$ is the tangential component of aircraft velocity, and $\phi$ is the angle of aircraft heading. The apparent angular velocity of the aircraft about the VOR station is the component of its linear velocity which is orthogonal to its position vector with respect to the station divided by the magnitude of the position vector. Hence $\omega = V/D \sin(\theta - \phi)$ and $\omega_{max} = V/D$. The magnitude of V can be considered a constant and might be set equal to the maximum speed of the aircraft and D is available as the output of distance measuring equipment (DME). Thus if we select $\omega_{max}=V/D$ the system can track any phase changes that occur due to an actual change in position of the aircraft and reject phase changes that occur faster than $\omega_{max}$.

Figure 5:
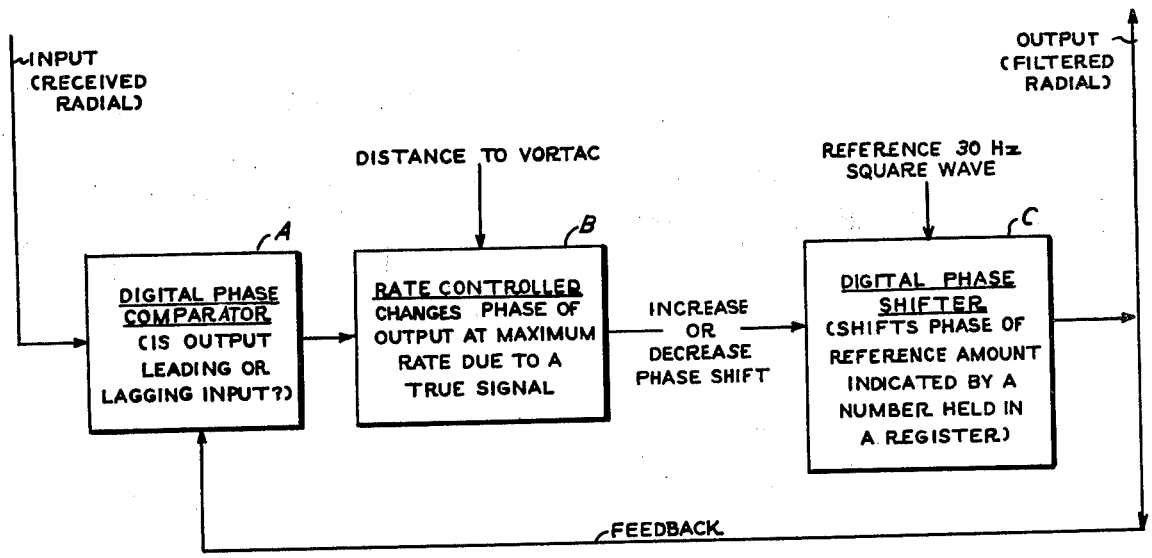
FIG. 5 is a simplified block diagram of a scalloping suppression system within which the variable phase shifter of the present invention might be utilized.

FIG. 5 is a simplified block diagram of such a scalloping suppression system. The received 30 Hz sinusoidal reference wave is converted to a square wave and the square wave is fed to digital phase shifter C which shifts the phase of the reference wave by an amount proportional to a number which is held in a digital register which comprises a part of the digital phase shifter. The output of digital phase shifter C is fed to digital phase comparator A, as is a square wave which is derived from the variable 30 Hz received sinusoidal signal (denoted as the received radial in FIG. 5.) Phase comparator A determines whether the delayed reference wave leads or lags the variable phase wave and feeds a signal to digital phase shifter C to increase or decrease the stored number depending on whether the delayed reference leads or lags the variable phase signal. The increase or decrease signal is fed to phase shifter C through rate controller B which limits the rate of the increase or decrease adjustments in proportion to the distance from the aircraft to the VOR ground station which distance is applied to the controller as an analog voltage. Hence the maximum rate at which the phase of the reference 30 Hz square wave can follow the phase of the variable 30 Hz square wave is limited to a value dependent on the aircraft to station distance which value as shown above is the maximum rate of change of phase due to actual changes in position of the aircraft. The output of digital phase shifter C is the output of the scalloping suppression system.

Figure 6:
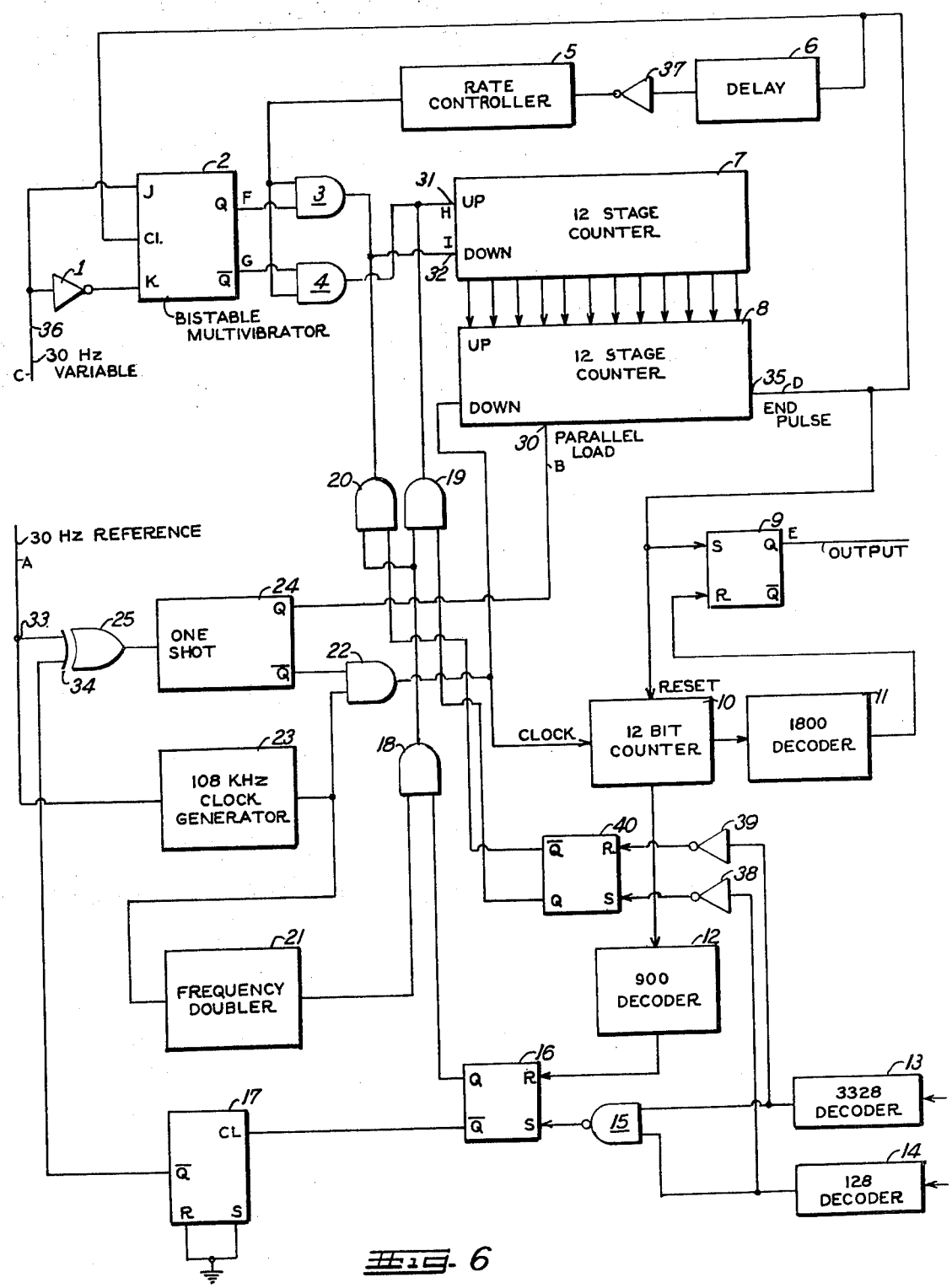
FIG. 6 is a detailed block diagram of the scalloping suppression system of the invention.

FIG. 6 is a more detailed block diagram of the scalloping suppressor system and shows the essentials of the system except for the initialization circuitry. The digital phase shifter - phase comparator network of the present invention includes up-down counters 7 and 8 and clocked bistable multivibrator 2. In the digital phase shifter, the reference 30 Hz square wave is delayed by an amount proportional to a binary number which is stored in counter 7. Upon occurrence of the leading edge of the reference square wave the number is parallel loded into counter 8 which is down counted to effect the delay or phase shift, the end of count pulse marking the beginning of the delayed reference signal.

The phase comparator 2 compares the phases of the received variable phase signal and the delayed signal from counter 8. If the delayed reference signals leads the variable phase signal the phase comparator generates a pulse to increase the number held in counter 7 of the digital phase shifter. This increases the phase shift of the delayed signal and thus reduces the phase difference between the two signals. This process continues until the phase difference is essentially zero. Conversely if the delayed reference signal lags the variable phase signal the phase comparator generates a pulse to decrease the number in counter 7 of the phase shifter, reducing the phase difference until the two phases are essentially equal.

The rate controller 5 determines the rate at which the number which is held in counter 7 may be changed. In the operation of the system the phase comparator generates pulses to increase or decrease the stored number at a 30 Hz rate. Hence the number may be adjusted 30 times each second but the rate controller limits the rate of adjustment by inhibiting a percentage of the phase comparator output pulses from being gated through to counter 7. In other words, if the pulse frequency at a distance of one mile is 30 Hz, then at a distance of 5 miles the rate controller passes only one out of every five pulses which results in a pulse frequency one-fifth that of the 1 mile rate or 6 Hz. At 100 miles the rate controller passes only one out of every one hundred pulses resulting in a 0.3 Hz rate. Since the number stored in the counter represents phase shift the rate at which the number is changed is the rate at which the phase of the reference signal can follow the phase of the variable phase signal. The rate controller is set so that this rate is the maximum rate of change due to an actual position change of the aircraft as discussed above.

A salient advantage of the present system is that it utilizes digital circuitry in critical areas. This provides for an extremely accurate system as well as eliminating the adverse effects of temperature and life upon the operation of the system. The accuracy of the phase shift produced by the digital phase shifter is based only on how well a selected number of periods of the clock frequency (3600 periods in the embodiment disclosed) approximates one period of the transmitted 30 Hz signal, and the use of a phase locked loop clock generator renders the clock frequency exact. Additionally, use of the up-down counters in the phase shifter of the invention renders the amount of phase difference between input and output irrelevant and allows a greatly simplified and improved type of phase comparator which only indicates whether the signal is leading or lagging to be used. Also with the up-down counters, end point uncertainty and the problem of resetting the circuit when phase shifts of greater than 360° are encountered are eliminated. The first counter replaces the integrator of conventional type one position servos and its digital nature eliminates the inherent drift and offset problems of conventional current capacitance integrators. It is important to note that the digital phase shifter of the invention finds independent use by itself and may be used to replace a resolver in phase shifting applications. Because the phase accuracy of the signal shifted is not limited by temperature effects or component drift a digital resolver more accurate than conventional resolvers by orders of magnitude is realizable over a wide temperature range. Also because the system operates with square waves the need for high spectral purity sinusoids is eliminated and an easy interface for further digital processing is provided.

By the use of an analog timer the circuitry involved in the rate controller is considerably simplified. If a digital divide by N system were used the large counter necessary to accommodate the large range of values of N along with associated circuitry would be complex. The present rate controller provides a divide by N function over a wide range of values that is controlled by an analog voltage. The rate controller can also be used as a wide-range speed controller for A.C. machinery or as a proportional controller for applying power to an A.C. load. If zero crossing pulses were generated every time the A.C. line crossed the 0 voltage they could be applied to the rate controller and the output would be a pulse train having a frequency less than or equal to the line. Thus if the output of the rate controller were used to trigger a thyristor the power would be applied to the load in proportion to the D.C. control voltage.

The operation of the system of FIG. 6 will now be described in greater detail in conjunction with the waveform diagram of FIG. 7. The received variable phase and reference sine waves are converted to square waves which are in phase with the sine waves by means not shown in FIG. 6. The 30 Hz reference square wave is applied to the system at circuit point 33. It is fed to exclusive OR gate 25 which either inverts or does not invert the square wave depending upon whether input 34 of the gate is high or low. Assuming that the square wave is not inverted it is fed to one-shot multivibrator 24 and is shown at line A of FIG. 7. On the leading edge of the reference square wave one-shot multivibrator 24 fires, providing a short pulse at the Q output shown at line B of FIG. 7. This pulse is fed to parallel load input 30 of counter 8 and is effective to transfer the number stored in counter 7 which is indicative of the amount of the delay to counter 8.

In the embodiment of the invention shown the maximum possible stored number is chosen to be 3599, the minimum number is zero and the reference square wave can therefore be shifted from 0° to 359.9° in steps of 0.1°. The proper clock frequency for counting down counter 8 is therefore 3600 × 30 or 108 KHz and since for proper operation the clock frequency should be within 0.01° of the correct frequency it has been found advantageous to utilize a phase locked loop having a divide by 3600 counter in its feedback path for clock generator 23 to multiply the 30 Hz input wave by exactly 3600.

After the one-shot multivibrator pulse at output Q ends the Q output of the one-shot multivibrator goes high thus gating the clock pulses from the 108 KHz clock generator 23 through AND gate 22. These pulses are fed to the down count input of counter 8 and the counter is counted down until an end of count pulse is obtained from the output 35 of the counter. The amount of time taken to count the counter down, which is controlled by the number originally stored in counter 7 and transferred to counter 8, is the time that the reference square wave is delayed. The end of count pulse is shown at line D of FIG. 7. This end of count pulse is fed to the S input of bistable multivibrator 9 thereby causing the Q output of the multivibrator to go high and, as will be explained in greater detail below, this output is held high for a time equal to 50% of the duration of the square wave at which time the multivibrator is reset and the Q output goes low. Thus the delayed square wave is reconstructed at the Q output of bistable multivibrator 9.

The end of count pulse at output 35 of counter 8 is also fed to the clock input of bistable multivibrator 2 which is the phase comparator of the system. The 30 Hz variable square wave is applied to the system at circuit point 36 and is fed to the J input of bistable multivibrator 2 as well as to the input of inverter 1, the output of which is fed to the K input of the bistable multivibrator. Bistable multivibrator 2 serves as a phase comparator in the following way. If at the time that the multivibrator is clocked, the J input has a signal applied thereto and the K input does not, this means that the variable square wave is high at the time that the leading edge of the delayed reference square wave occurs and that the reference square wave has been delayed too much. Under these conditions an output pulse will appear at the Q output of multivibrator 2 which may be fed through AND gate 3 to the down input of 12-stage counter 7 to reduce the number stored in the counter by one thereby reducing the delay. This condition is illustrated in the left-hand group of waveforms in FIG. 7 wherein it is noted that the end of count pulse at line D and the output pulse at line E occur while the variable square wave at line C is high. Thus as is seen on line F the Q output of the multivibrator will go high causing a down count pulse to be applied to the counter as is seen on line I. On the other hand, if the J input to multivibrator 2 is low at the time that a clock pulse is inputted, an output will appear at output Q which is fed through AND gate 4 to the up input of 12-stage counter 7 thus increasing the number in the counter and the delay time. This situation is illustrated in the right-hand group of pulses in FIG. 7 where it is seen that the end of count pulse at line D occurs before the variable square wave at line C thus causing the output Q of the phase detector to go high and causing a count up pulse which is shown on line H. Thus it is seen how the phases of the delayed reference square wave and the variable square wave are compared by multivibrator 2 and the delay time of the counter system is adjusted accordingly to cause the delayed reference square wave to follow changes in phase of the variable square wave.

Figure 8:
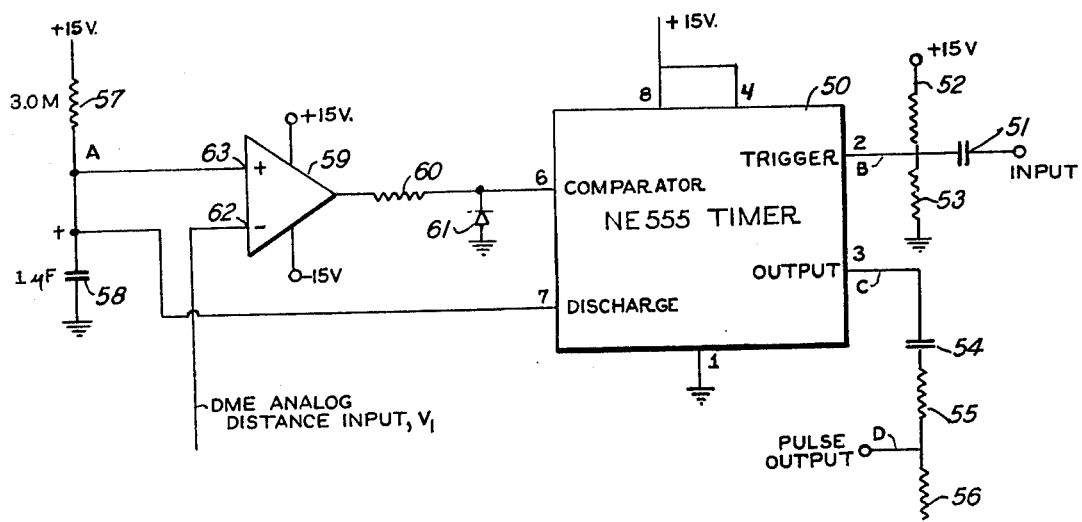
FIG. 8 is a circuit diagram of the rate controller of FIG. 6.

According to a further aspect of the invention the rate at which the delayed square wave can follow changes in phase of the variable square wave is controlled by rate controller 5 which is illustrated in greater detail in FIG. 8. Each end of count pulse at output 35 of counter 8 besides being fed to the clock input of multivibrator 2 is fed to delay network 6 and rate controller 5. The rate controller either inhibits or passes the pulses which are applied to it. The percentage of the pulses which the rate controller passes on to AND gates 3 and 4 is inversely proportional to the distance from the VOR station and is, hence, directly proportional to the maximum rate of phase change which could be due to an actual change in aircraft position. Delay 6 is adjusted so that the pulse output of rate controller 5 does not occur before multivibrator 2 changes state.

Figure 10:
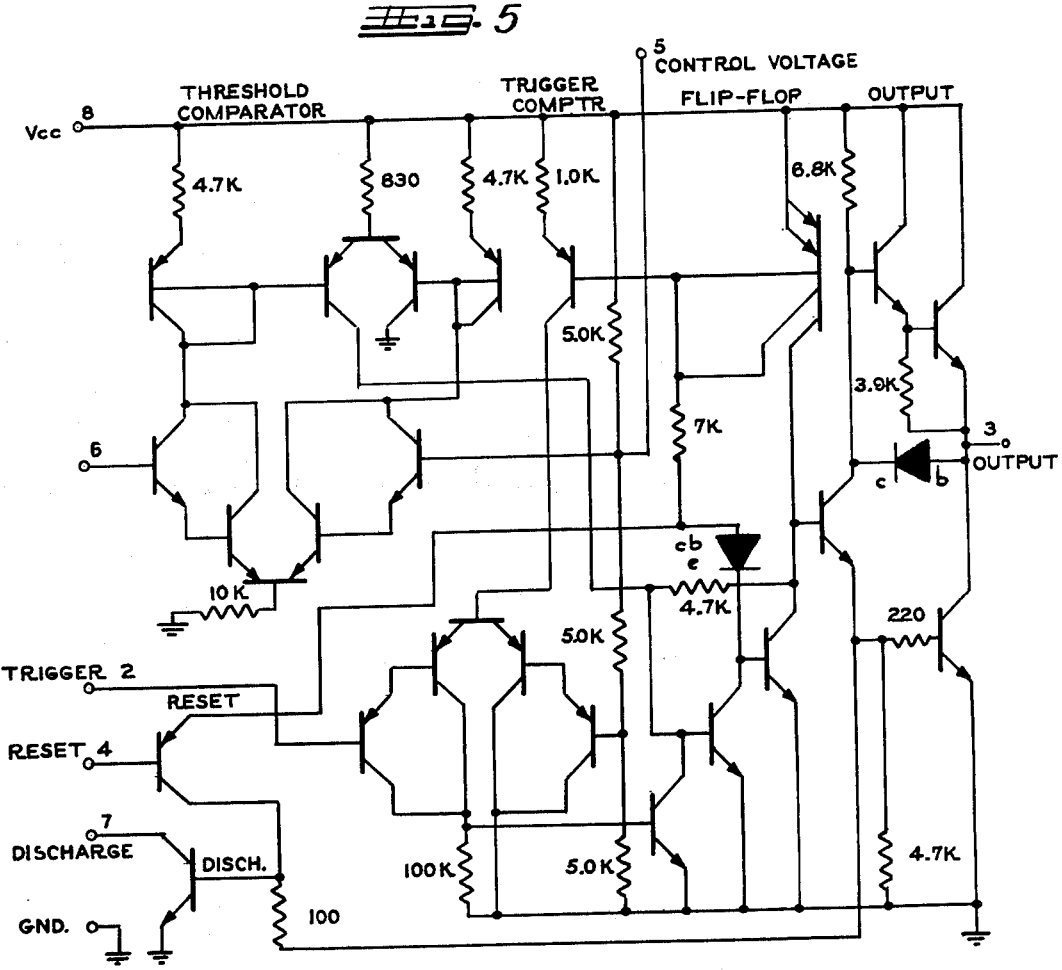
FIG. 10 is the circuit diagram of timer 50 of FIG. 8.
Figure 9:
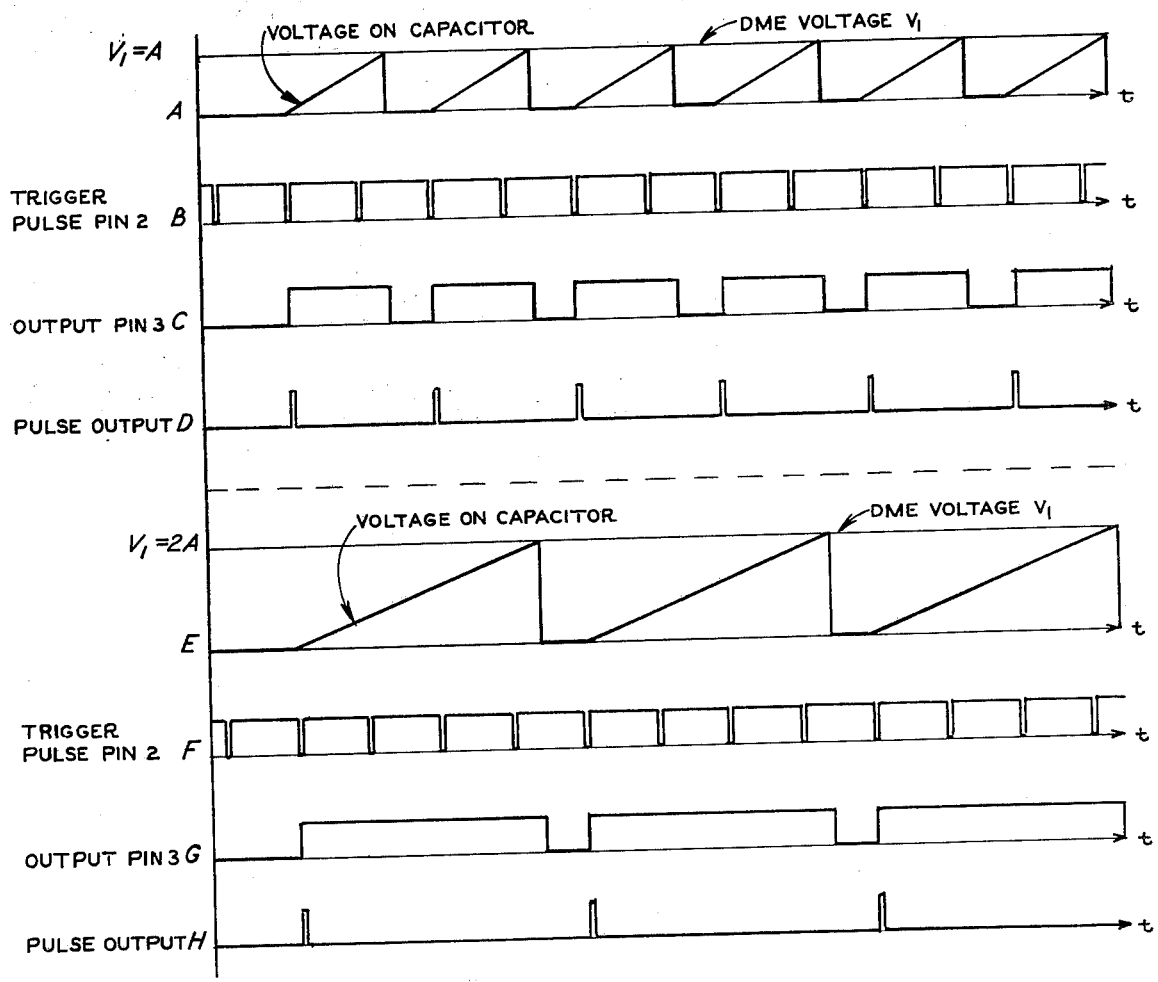
FIG. 9 is a waveform diagram useful in explaining the operation of the circuit of FIG. 8.
Figure 10:
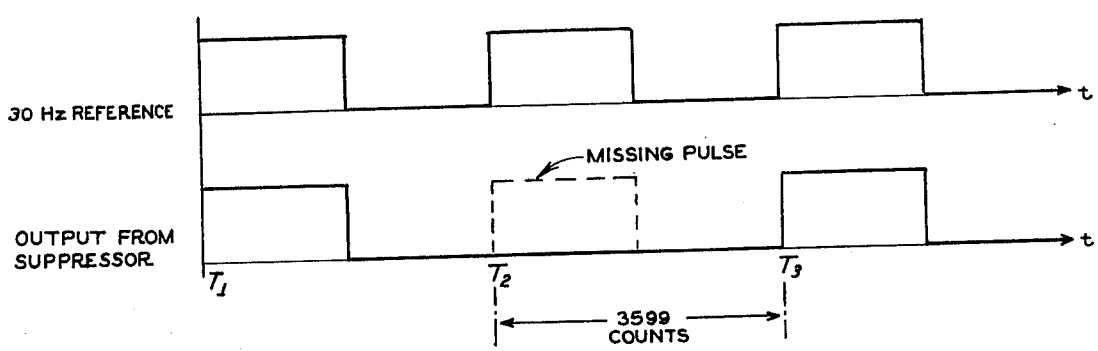

Because of its importance in the system the operation of rate controller 5 will be described in detail in conjunction with FIGS. 8 to 10 before the remainder of the system of FIG. 6 is described.

Referring to FIG. 8, the type 555 timer 50 is used as a monostable multivibrator. This timing circuit is commercially available as the Motorola MC1555 monolithic circuit or the Signetics NE555 and the schematic diagram thereof is shown in FIG. 10 pin 5 not being used in FIG. 8.

Referring to FIG. 8, capacitor 58 which may be a one uf capacitor is initially held discharged by a transistor within timer 50. When the timer is triggered by a negative-going pulse at pin 2 which is the output of inverter 37 in FIG. 6 applied through capacitor-resistor network 51,52,53, the short or discharge circuit across capacitor 58 is released, this capacitor begins to charge through resistor 57, and the output at pin 3 of the timer goes high. The charging of the capacitor is shown at line A (of the waveform diagram shown in FIG. 9), and the output at pin 3 is shown on line C. A voltage $V_1$ which is proportional to the distance between the aircraft and the VOR station, and which may be obtained as the output of a DME is applied to input 62 of comparator 59. Resistor 57 is chosen to be of an extremely high value, for instance, three megohms, as shown in FIG. 8, so that the combination of the 15 volt voltage source and resistor 57 approximates a constant current source. If greater accuracy is required, an actual current source may be used. This causes capacitor 58 to charge approximately linearly, and at some time during its charging the voltage across the capacitor, which is fed to input 63 of comparator 59, will exceed the DME analog distance voltage $V_1$ applied to input 62 of the comparator. This will cause comparator 59 to emit an output signal which is fed to pin 6 of timer 50 which causes the output of the timer at pin 3 to go low and the short circuit across capacitor 58 to be restored. Thus, it is seen at line C of FIG. 9 that the duration of the output at pin 3 is the time that it takes the capacitor to charge to the DME voltage value indicated as A on the figure. The output at pin 3 is differentiated by capacitor 54 and its level changed by resistors 55 and 56 resulting in the pulse output shown on line D. During the time that the output at pin 3 is high the timer 50 cannot be retriggered by input pulses on pin 2 and since the capacitor 58 charges approximately linearly the circuit produces only one output pulse for every two input pulses. Thus, it is seen in FIG. 9 that every other input pulse on line B is ignored. When the DME distance is doubled to 2A, as illustrated on lines E, F, G and H of FIG. 9 it takes capacitor 58 twice as long to charge to the DME voltage level and one output pulse is produced for every four input pulses. Thus when the rate controller of FIG. 8 is utilized in FIG. 6 it is seen how a percentage of pulses from phase comparator 2 may be inhibited from reaching counter 7 and from changing the count thereof.

Referring again to FIG. 6 besides being fed to phase comparator 2 and to the multivibrator 9 the end of count pulse at output 35 of counter 8 is also fed to the reset input of 12 bit counter 10, thereby resetting this counter to the zero state. Clock pulses from clock generator 23 start counting counter 10 up until the number 1800 is reached at which point decoder 11, which may be a conventional decoder as known to those skilled in the art, detects the number 1800 and provides an output signal to the reset input of the multivibrator 9, thus causing the signal at output Q of multivibrator 9 to go low. Such an arrangement insures that the output square wave has a 50% duty cycle as phase may be significant in, for instance, an analog computer in which the output may be utilized, and analysis has shown that variation from a 50% duty cycle of only 1% contributes a phase error of 3.6 degrees. The divide by 1800 counter allows the output to stay high for exactly 1800 counts or 180° of the 30 Hz frequency thus insuring a 50% duty cycle.

It should be noted that the digital number stored in counter 7 at any time is indicative of the phase difference between the reference square wave and the variable square wave. In order to determine bearing, therefore, instead of further processing the output signal of multivibrator 9 and comparing its phase to the reference phase, the number stored in counter 7 may be decoded and used as an indication of bearing.

The remaining circuitry shown in FIG. 6 is utilized to obviate other operational problems not related to the variable phase shifter of the present invention. Accordingly, while a detailed discussion of that circuitry is contained in parent application Ser. No. 561,466, now U.S. Pat. No. 4,014,025, it is not repeated here.

While specific embodiments of the invention have been disclosed and described the invention is not limited solely thereto but rather includes all embodiments which would be apparent to one skilled in the art and which come within the spirit and scope of the invention.

What is claimed is:

1. A variable phase digital phase shifter for shifting the phase of an input signal comprising:
    storage means for storing a signal indicative of the amount by which the phase of the input signal is to be shifted;
    a source of clock pulses;
    a first input signal terminal;
    counting means connected to said first input signal terminal, to said storage means and to said clock pulse source and responsive to receipt of an input signal at said first input signal terminal for counting a number of pulses, from said clock pulse source, determined by the signal stored in said storage means;
    output means coupled to said counting means for generating an output signal when said counting means has counted said number of pulses; and
    adjusting means for adjusting the signal stored in said storage means to adjust the phase difference between the output signal and the input signal.

2. A phase shifter as claimed in claim 1 in which said adjusting means comprises:
    a second terminal for receiving signals indicative of the point to which the phase of the input signal is to be shifted;
    switching means connected to said output means and to said second terminal and adapted to assume a first state upon receipt of a signal at said second terminal and a second state upon generation of an output signal; and
    gating means coupled to said switching means, to said output means and to said storage means for adjusting the signal stored in said storage means to decrease the amount of phase shift indicated by that stored signal when the output signal is generated while said switching means is in its first state and to increase the amount of phase shift indicated by the stored signal when the output signal is generated while said switching means is in its second state.

3. A phase shifter as claimed in claim 2 in which said storage means comprises an up-down counter and said gating means is connected to the up and down inputs of said up-down counter to decrease the number stored in said up-down counter when the output signal is generated while said switching means is in its first state and to increase the number stored in said up-down counter when the output signal is generated while said switching means is in its second state.

4. A phase shifter as claimed in claim 3 in which said counting means comprises a binary counter for counting down from the number of pulses determined by the signal stored in said storage means.

5. A phase shifter as claimed in claim 4 in which the stages of said the up-down counter are connected in parallel with the stages of said binary counter to parallel load the number stored in said up-down counter into said binary counter upon receipt of an input signal at said first input signal terminal.

6. A phase shifter as claimed in claim 1 in which said storage means comprises an up-down counter and said adjusting means is connected to the up and down inputs of said up-down counter to incrementally change the number stored therein by counting up or counting down.

7. A phase shifter as claimed in claim 1 in which said counting means comprises a binary counter for counting down from the number of pulses determined by the signal stored in said storage means.

8. A phase shifter as claimed in claim 1 in which said first input signal terminal receives input pulse signals and in which said output means includes means for generating output pulse signals having the same duration as the input pulse signals.

9. A variable phase shift digital phase shifter for shifting the phase of an input signal comprising:
- an up-down digital counter;
- a second digital counter;
- means connecting the stages of said up-down digital counter in parallel with the stages of said second digital counter;
- input means connected to said second digital counter and responsive to receipt of an input signal for parallel loading a number stored in said up-down digital counter into said second digital counter, while retaining the number in said up-down digital counter, and starting said second digital counter counting downward;
- output means connected to said second digital counter for generating a phase shifted output signal when said second digital counter has counted downward from the number to zero; and
- control means connected to the up and down inputs of said up-down digital counter to incrementally change the number stored therein by counting up or counting down.

10. A phase shifter as claimed in claim 9 further comprising clock means for applying clock pulses to down count said second digital counter.

11. A phase comparator for comparing the phases of two signals comprising:
- first input means for receiving a first input signal;
- second input means for receiving a second input signal;
- switching means connected to said first and second input means and adapted to assume a first state upon receipt of the first input signal at said first input means and to assume a second state upon receipt of the second input signal at said second input means; and
- gating means connected to said switching means and to said second input means for generating a first phase comparison signal upon receipt of the second input signal while said switching means is in its first state and a second phase comparison signal upon receipt of the second input signal while said switching means is in its second state.

12. A phase comparator as claimed in claim 11 in which said switching means comprises a clocked multivibrator having said first input means connected to one of the set and reset inputs thereof and having said second input means connected to the clock input thereof.

13. A phase comparison and following system for causing the phase of a second signal to follow the phase of a first signal comprising:
- first input means for receiving a first input signal;
- second input means for receiving a second input signal;
- switching means connected to said first and second input means and adapted to assume a first state upon receipt of the first input signal at said first input means and to assume a second state upon receipt of the second input signal at said second input means;
- gating means connected to said switching means and to said second input means for generating a first phase comparison signal upon receipt of the second input signal while said switching means is in its first state and a second phase comparison signal upon receipt of the second input signal while said switching means is in its second state; and
- control means connected to said gating means for adjusting the phase of one of said first and second input signals to decrease the delay of the phase of said second input signal with respect to said first input signal in response to a first phase comparison signal and to increase the delay of the phase of said second input signal with respect to said first input signal in response to a second phase comparison signal.

* * * * *